March 5, 1963  T. B. PHILIP  3,080,091
PRESSURE SAFETY DEVICE
Filed Oct. 28, 1960

INVENTOR.
THOMAS BRUCE PHILIP

BY
Ward, Neal, Haselton, Orme & McElhannon
ATTORNEYS.

United States Patent Office 3,080,091
Patented Mar. 5, 1963

3,080,091
PRESSURE SAFETY DEVICE
Thomas Bruce Philip, Effingham, England, assignor to The Distillers Company Limited, Edinburgh, Scotland, a British company
Filed Oct. 28, 1960, Ser. No. 65,833
3 Claims. (Cl. 220—89)

The present invention relates to pressure safety devices of the type in which an escape path for a fluid under pressure is normally sealed by means of a frangible diaphragm. Should the pressure of the fluid increase beyond a predetermined point the diaphragm ruptures and allows the fluid to escape.

One danger present in pressure safety devices of the above type is that two or more frangible diaphragms can be fitted together within the device and thus the pressure at which rupture occurs is considerably increased, with the consequent danger that the vessel containing the fluid under pressure may explode before the safety device gives pressure relief.

According to the present invention a pressure safety device comprises a fluid escape path normally closed by means of a frangible diaphragm the periphery of which is in the form of an annular flange, which frangible diaphragm is held in position by clamping means acting on said annular flange, characterised in that the outer edge of the annular flange is provided with a perpendicular skirt which fits within a groove within the assembled device, the width of the groove being less than twice the thickness of the skirt.

The bodies of safety devices according to the present invention can be similar to the bodies of known safety devices. Usually such bodies comprise two sections which can be separated in order to fit the frangible diaphragm. The clamping means by which the diaphragm is held in position on such devices usually consists of two surfaces, one in each section, which can be brought together so that they act on the annular flange of the diaphragm, thus clamping it in position and making a fluid-tight seal.

A frangible diaphragm for use in a safety device according to the present invention may be flat or dome-shaped. It possesses a skirt on the outer edge of its annular flange by means of which it is held in position within the device. This skirt is perpendicular to the plane of the frangible diaphragm which, in the case of dome-shaped diaphragms, is defined as the plane in which the dome-shaped portion of the diaphragm and its annular flange meet. The skirt may be continuous running completely round the outer edge of the annular flange of the diaphragm or it may be discontinuous. Preferably the frangible diaphragm, its annular flange and the skirt whether continuous or discontinuous are formed as an integral unit from a single sheet of material, for example copper or nickel.

The groove within the assembled safety device may be provided wholly within one section of the body thereof. However, in a preferred form the groove is formed as the two sections of the safety device are brought together. As the width of the groove is less than twice the thickness of the skirt it is not possible to force two diaphragms into the safety device.

The accompanying drawings illustrate a safety device according to the present invention and various types of frangible diaphragm which can be employed therewith.

FIGURE 1 is a vertical cross-section of a safety device. FIGURES 2 and 3 show vertical cross-sections of alternative plugs which can form part of a safety device such as that shown in FIGURE 1. FIGURE 4 shows a side elevation and a plan view of an alternative form of frangible diaphragm for the safety device of FIGURE 1.

In FIGURE 1, the fluid escape path 6 leads from the pressure vessel (not shown) to which the safety device is fitted. The body of the safety device consists of an outer tubular section or socket member 7 into which is screwed a hollow, open-ended plug 8. The inner end 9 of this plug acts on the annular flange of the frangible diaphragm 10, holding it in position and sealing the fluid escape path. The outer edge of the annular flange possesses a perpendicular, continuous skirt 11 which, in the assembled device, lies within a groove 12 formed between the tubular section of the safety device and a recess in the end of the open-ended plug, more particularly in this embodiment the groove 12 is formed in part by a recess at the inner end of the plug and in part by a cooperating countersunk portion at the base of socket 7. The width of this groove is less than twice the thickness of the skirt and consequently it is not possible to fit accidentally two frangible diaphragms within the device. FIGURE 2 shows an alternative form of plug which can be used to replace the plug shown in FIGURE 1. In this alternative form of plug the end outer wall thereof contains an annular notch 13 into which the top of the skirt of a frangible diaphragm can be bent. In this way replacement of frangible diaphragms can be rapidly effected by fitting a new plug to which a frangible diaphragm has already been fitted.

Figure 1:
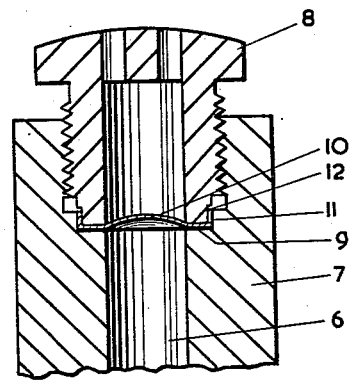
Figure 2:
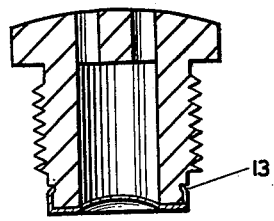
Figure 3:
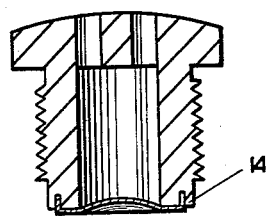
FIGURE 3 shows a further alternative form of plug in which the groove 14 accommodating the skirt of the frangible diaphragm is located entirely in that surface of the plug which acts on the annular flange of the frangible diaphragm.
Figure 4:
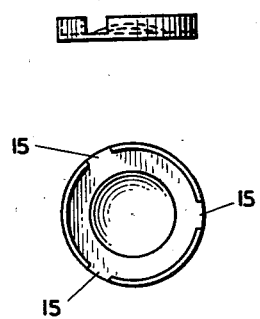
FIGURE 4 shows two views of an alternative form of dome-shaped, frangible diaphragm similar to those shown in FIGURES 1 to 3. It differs, however, from these diaphragms in that the skirt is split at the three points 15.

The preferred safety devices comprise dome-shaped frangible diaphragms which have been manufactured according to the process described in British patent specification No. 736,229, but if desired flat frangible diaphragms bearing suitable skirts can be employed.

If desired the annular flange of the frangible diaphragm and the body of the safety device can possess inter-related mating means which prevent the fitting of an incorrect diaphragm within a given safety device. One method of arranging and using mating means in connection with safety devices containing dome-shaped frangible diaphragms is described in British patent specification No. 716,734.

Safety devices according to the present invention can be used in connection with all types of pressure vessels. They are particularly valuable for the protection of gas cylinders such, for example, as cylinders used for the storage of carbon dioxide. A typical frangible diaphragm for use in a carbon dioxide storage cylinder can be made from fully annealed pure nickel foil of thickness 0.005 inch, the diameter of the dome-shaped portion of the diaphragm being $7/16$ inch.

I claim:
1. A pressure safety device consisting essentially of a frangible diaphragm which is capable of rupturing when subjected on one side to a predetermined fluid pressure, having a centrally disposed rupturing portion, an annular flange portion and a skirt portion at the periphery of and perpendicular to the flange portion, a socket member having a fluid passage, a plug member threadingly engaged within the socket and provided with a fluid passage in register with the fluid passage in the socket, said plug member at its inner end being peripherally recessed to provide a restrictive groove for receiving the skirt portion of the diaphragm, the outer periphery of said groove being defined by the oppositely disposed portion of said socket, the width of said groove being at least equal to the thickness but less than twice the thickness of said skirt portion to thereby prevent accidental insertion of more than one diaphragm skirt into said groove, said plug and socket members conjointly providing means for clamping therebetween the flange portion of the diaphragm in a plane substantially normal to the axis of said fluid passage with the rupturing portion thereof extending across and closing said fluid passage and holding said skirt portion in said groove.

2. A pressure safety device consisting essentially of a frangible diaphragm which is capable of rupturing when subjected on one side to a predetermined fluid pressure, having a centrally disposed rupturing portion, an annular flange portion and a skirt portion at the periphery of and perpendicular to the flange portion, a socket member having a fluid passage, a plug member threadingly engaged within the socket and provided with a fluid passage in register with the fluid passage in the socket, the flange portion of said diaphragm being disposed intermediate the plug and socket members and in contact with each with the rupturing portion of the diaphragm closing the fluid passage, said plug member at its inner end face being provided with a groove disposed concentrically with and spaced inwardly from the peripheral surface of the plug, the width of said groove being at least equal to the thickness but less than twice the thickness of said skirt portion to thereby prevent accidental insertion of more than one diaphragm skirt into said groove, said plug and socket members conjointly providing means for clamping the flange portion of the diaphragm therebetween and holding said skirt portion in said groove.

3. A pressure safety device consisting essentially of a frangible diaphragm which is capable of rupturing when subjected on one side to a predetermined fluid pressure, having a centrally disposed rupturing portion, an annular flange portion and a skirt portion at the periphery of and perpendicular to the flange portion, a socket member having a fluid passage, a plug member threadingly engaged within the socket and provided with a fluid passage in register with the fluid passage in the socket, means conjointly provided by said plug and socket members for clamping therebetween the flange portion of said diaphragm in a plane substantially normal to the axis of said fluid passage with the rupturing portion thereof extending across and closing said fluid passage and holding the skirt portion within a restrictive groove having a width at least equal to the thickness but less than twice the thickness of said skirt portion to thereby prevent accidental insertion of more than one diaphragm in the device, said groove being provided in part in said plug by a recessed portion at the inner end thereof and in part by a cooperating countersunk portion at the base of said socket.

References Cited in the file of this patent

UNITED STATES PATENTS 2,582,171 Simpson _____ Jan. 8, 1952

FOREIGN PATENTS 898,994 Germany _____ Oct. 29, 1953